United States Patent [19]

Sessions

[11] Patent Number: 5,086,976

[45] Date of Patent: Feb. 11, 1992

[54] SPRINKLER PIPE FLOW LIMITER

[76] Inventor: James R. Sessions, 127 Thayer Way, Vallejo, Calif. 94589

[21] Appl. No.: 617,666

[22] Filed: Nov. 26, 1990

[51] Int. Cl.$^5$ .................... B05B 15/06; F15D 1/02
[52] U.S. Cl. .................... 239/200; 239/590.3; 138/40; 138/42
[58] Field of Search ................ 138/42, 44, 40; 239/200, 201, 570, 590, 590.3; 405/39, 41; 251/118, 127

[56] References Cited

U.S. PATENT DOCUMENTS

| | | | |
|---|---|---|---|
| 325,459 | 9/1885 | Taylor | 138/42 |
| 2,409,294 | 10/1946 | Martin | 138/44 |
| 2,525,874 | 10/1950 | De Larzelere | 138/44 |
| 2,810,607 | 10/1957 | Hruby, Jr. | 239/590.3 |
| 4,131,235 | 12/1978 | Lieding | 239/570 |
| 4,393,992 | 7/1983 | Strunk et al. | 239/200 |
| 4,562,962 | 1/1986 | Hartman | 239/200 |
| 4,760,957 | 8/1988 | Rosenberg | 239/570 |
| 4,825,897 | 5/1989 | Shade | 239/571 |
| 4,842,198 | 6/1989 | Chang | 239/570 |
| 4,960,260 | 10/1990 | McEnearney | 138/42 |

*Primary Examiner*—Andres Kashnikow
*Assistant Examiner*—Christopher G. Trainor
*Attorney, Agent, or Firm*—Linval B. Castle

[57] ABSTRACT

A sprinkler flow control fixture for insertion between a water main and a sprinkler head contains a solid wall separating the inlet side from the outlet side with a passage therethrough calibrated to permit a flow rate of about 130% the normal flow of the sprinkler head so that removal of the head will not result in excessive water loss and drop in water main pressure.

4 Claims, 1 Drawing Sheet

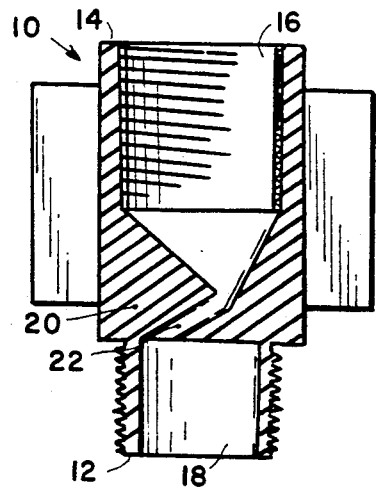
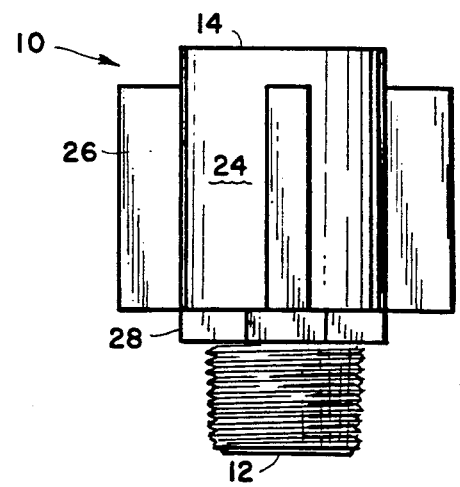
FIG. 1    FIG. 2
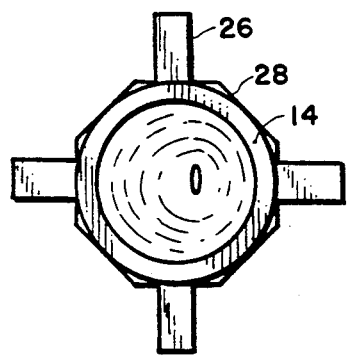
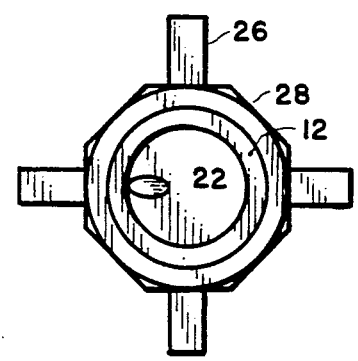
FIG. 3    FIG. 4
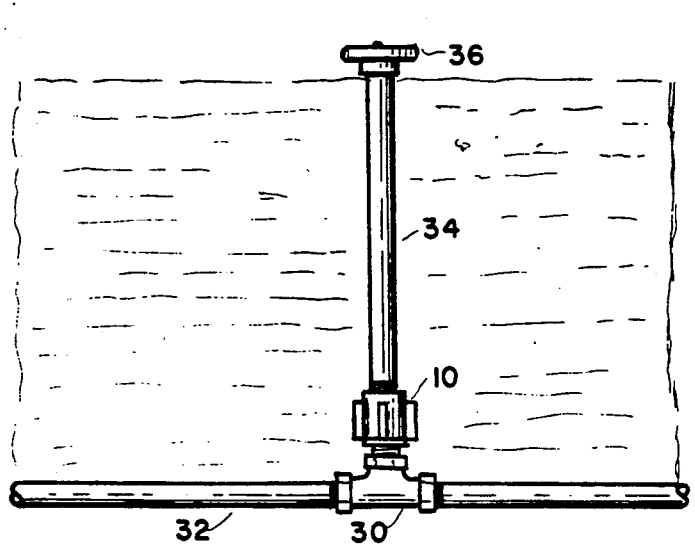
FIG. 5

SPRINKLER PIPE FLOW LIMITER

BRIEF SUMMARY OF THE INVENTION

This invention relates to irrigation plumbing and particularly to a plumbing fixture for limiting to a predetermined flow the water passing through a pipe such as a sprinkler or bubbler pipe.

When any type of "above-ground" irrigation system is used, there is always a possibility that something or someone will remove the bubbler or sprinkler head to produce a water "geyser" when the water is next turned on in the system. This does not present a great problem in the smaller residential sprinkler systems used primarily during the daylight hours because the water geyser is readily observable. However, in larger systems used for watering golf courses, city parks or boulevard dividers which are normally watered during pre-dawn hours for maximum water pressure and with the watering controlled by electrical timers and valves, a single missing sprinkler head can result in an uncontrolled flooding in one area and a serious drop in water pressure resulting in dry areas.

Many types of fixtures have been devised to correct the geyser problem caused by missing sprinker heads. One such type, such as shown in U.S. Pat. No. 4,825,897, is a coupling having a large cylindrical bore containing a spherical ball which normally floats near the center of the bore at a normal sprinkler flow rate but which will rise to block the exit port of the coupling if the flow exceeds the normal sprinkler flow. In general, such flow control devices operate quite satisfactorily when used in connection with manually controlled water valves, but the electrical valves associated with electric timers turn on the water so very quickly that the rush of water under full pressure through the device will usually drive the ball directly into the exit port to shut off the water before any flow begins.

The present flow limiter does not attempt to shut off the water flow to a sprinkler head but merely limits the flow to the approximate amount required by the sprinkler. Thus, if a sprinkler head uses three gallons of water per minute at a certain pressure, a flow limiter will be selected that passes perhaps four gallons per minute at that pressure. Therefore, a sprinkler or bubbler head may be broken off or removed and the maximum water loss from that particular sprinkler riser will be substantially unchanged. Even more important, the pressure within the water main will remain substantially unaffected and the remainder of the sprinklers on the water main will operate normally.

The flow limiter to be described is threaded on both inlet and outlet ends and is placed in line between and water main and the sprinkler head with a riser pipe coupled either above or below the coupling. Between the threaded ends of the limiter is a small passage having a predetermined cross-sectional area that will pass approximately 25–30% more water than the sprinkler or bubbler coupled to it. The passage is bored at a steep angle within the limiter to eliminate the possibility of a water geyser from the limiter in the event of a break immediately above the threaded outlet of the limiter. In such an event the water will merely overflow from the limiter which now acts as a bubbler.

BRIEF DESCRIPTION OF THE DRAWINGS

In the drawings which illustrate the preferred embodiment of the invention:

FIG. 1 is a sectional elevational view of the sprinkler pipe flow limiter;

FIG. 2 is an exterior elevational view thereof;

FIG. 3 is a top plan view thereof;

FIG. 4 is a bottom plan view thereof; and

FIG. 5 is a schematic view illustrating the flow limiter installed between a water main and sprinkler riser pipe.

DETAILED DESCRIPTION

FIG. 1 is a sectional view illustrating the interior of the flow limiter 10, a short plastic or polyvinyl chloride (PVC) pipe coupling designed to limit water flow through a sprinkler or bubbler head in the event the head has been removed. The limiter 10 is to be coupled between a water main and sprinkler head and has a male pipe thread at a first end and a corresponding female thread at the opposite end. The limiter is bi-directional in that it may be coupled to flow water in either direction but, for convenience, I have arbitrary designated the male end as the inlet or lower end 12 and the female end as the outlet or top end 14.

Both lower end 12 and top end 14 of the limiter are counterbored to contain small reservoirs about an inch deep. The top reservoir 16 contains the female pipe threads and is separated from the lower reservoir 18 by a solid plastic wall 20 having therein a passage 22 between the reservoirs 16 and 18.

Passage 22 lies at an angle through the wall 20 so that a rapid rush of water from one reservoir to the other will not cause a water geyser to spout from the limiter 10 without attached sprinkler. An angle of approximately 60° to the longitudinal axis of the limiter is adequate so that the ends of the passage 22 open near the sides of the reservoirs. Therefore, if a flow of water at full pressure is applied through the limiter, the passage 22 will direct it at that steep angle to swirl through the reservoir in the other end to prevent a high uncontrolled water geyser.

The cross-sectional area of a passage 22 must be calibrated during its manufacture so that the limiter 10 will pass adequate but not excessive water flow to its associated sprinkler head. For example, if a sprinkler head normally passes three gallons of water per minute at a certain pressure, the associated limiter 10 should pass about 25–30% more at that pressure, or about four gallons per minute. In the event of a loss of a "three-gallon" sprinkler head, four gallons is the maximum amount of water that will pass through the flow limiter. The result is that flooding of that particular area is minimized and water pressure in the main is not materially reduced to draw irrigation water from other areas.

FIG. 2 is an exterior elevational view of the limiter 10 illustrating the limiter body 24 with four vertical fins 26 radially attached to the exterior of the body for preventing accidental rotation of the limiter after its installation in the ground. For ease in wrench installation of the limiter 10, an octagonal nut 28 has been formed in the body 24 between the fins 26 and male threaded portion at the lower end 12.

FIGS. 3 and 4 are end views of the top end 14 and lower end 12, respectively, and show the approximate location of the ends of passage 22 between the upper and lower reservoir.

FIG. 5 is a schematic elevational view of a flow limiter 10 coupled between a pipe tee 30 in a water main 32 and a riser pipe 34 coupled to a sprinkler 36. It should be noted that, if desired, identical results are obtained if the bi-directional flow limiter 10 is reversed so that its male end is screwed into the sprinkler head while the female end is coupled to the riser pipe that is attached to the tee 30. In either instance, the loss of the sprinkler head 38 will result in only a slightly increased flow of water through the limiter 10 and an insignificant pressure drop in the water main 30.

I claim:

1. A flow control fixture for mounting in series with a water pipe between a supply main and an irrigation dispensing head having a first flow discharge rate at a first pressure and for limiting the flow of water through said pipe whenever said irrigation dispensing head has been removed from said pipe, said flow control fixture comprising:
   a housing having a water pipe inlet and a water pipe outlet;
   a plurality of fins radially attached to an exterior surface of said housing and aligned substantially parallel with the longitudinal axis of said housing;
   a wall within said housing separating said inlet and said outlet, said wall forming an inlet reservoir and an outlet reservoir in said housing; and
   a passage formed at an angle through said wall permitting a controlled flow of water between said inlet and said outlet, said angle directing said controlled flow of water against a side wall of said outlet reservoir, said controlled flow being approximately 130% of the first flow rate and the first pressure of said irrigation dispensing head.

2. The flow control fixture claimed in claim 1 wherein said water inlet and said water outlet are thread pipe members.

3. The flow control fixture claimed in claim 2 wherein said water inlet is a male threaded pipe.

4. A flow control fixture claimed in claim 2 wherein said water inlet is a female threaded pipe.

* * * * *